(12) United States Patent
Cornett et al.

(10) Patent No.: US 11,429,413 B2
(45) Date of Patent: Aug. 30, 2022

(54) METHOD AND APPARATUS TO MANAGE COUNTER SETS IN A NETWORK INTERFACE CONTROLLER

(71) Applicant: Intel Corporation, Santa Clara, CA (US)

(72) Inventors: Linden Cornett, Portland, OR (US); Parthasarathy Sarangam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1006 days.

(21) Appl. No.: 15/941,483

(22) Filed: Mar. 30, 2018

(65) Prior Publication Data

US 2019/0042293 A1    Feb. 7, 2019

(51) Int. Cl.
| | | |
|---|---|---|
| *G06F 11/30* | (2006.01) | |
| *G06F 11/34* | (2006.01) | |
| *G06F 9/455* | (2018.01) | |
| *G06F 9/32* | (2018.01) | |
| *G06F 16/903* | (2019.01) | |

(52) U.S. Cl.
CPC .......... *G06F 9/45558* (2013.01); *G06F 9/321* (2013.01); *G06F 11/30* (2013.01); *G06F 16/90335* (2019.01); *G06F 2009/45595* (2013.01)

(58) Field of Classification Search
CPC ............. G06F 11/3006; G06F 11/3041; G06F 11/3409
See application file for complete search history.

(56) References Cited

U.S. PATENT DOCUMENTS

| | | | |
|---|---|---|---|
| 7,080,172 B1 * | 7/2006 | Schmalz ............... | G06F 9/5016 709/220 |
| 8,588,242 B1 * | 11/2013 | Izenberg ............. | H04L 47/6225 370/412 |
| 10,433,035 B2 | 10/2019 | Chayat et al. | |
| 2009/0268611 A1 * | 10/2009 | Persson ................. | H04L 47/568 370/230 |
| 2015/0365289 A1 * | 12/2015 | Hidalgo Herrera ......................... | H04L 41/0833 370/389 |
| 2015/0378931 A1 * | 12/2015 | White ....................... | G06F 9/46 711/6 |
| 2018/0107627 A1 * | 4/2018 | LeBeane ............... | G06F 13/382 |
| 2018/0152366 A1 * | 5/2018 | Cornett ................ | G06F 3/0647 |

* cited by examiner

*Primary Examiner* — Jacob Petranek
(74) *Attorney, Agent, or Firm* — Compass IP Law PC (57) ABSTRACT

Technologies for dynamic statistics management include a computing device with a network interface controller (NIC) and a compute engine having a memory. The NIC is to provision a counter window to a software consumer executing in the computing device. The counter window is used to track a plurality of active counters associated with a network flow. The NIC determines whether one or more flush criteria are triggered. In so determining, the NIC transfers a value for each active counter to the memory, where global counter values are maintained.

25 Claims, 6 Drawing Sheets

METHOD AND APPARATUS TO MANAGE COUNTER SETS IN A NETWORK INTERFACE CONTROLLER

BACKGROUND

A computing device, such as a system in a data center, may serve various functions, such as compute, memory, storage, and networking. For example, a modern computing device may be configured to support a virtualization environment in which the computing device launches a number of virtual machine instances. A given virtual machine may have access to a subset of physical resources provided by the computing device, such as networking resources. Further, the computing device may offload control rules and usage monitoring tasks to a network interface controller (NIC) configured thereon. Continuing the example of virtualization, offloading such control rules and tasks allows a given virtual machine to interface directly with the NIC to perform networking functions, such as packet processing. Further still, the NIC may report monitored network statistics to a hypervisor or operating system of the computing device.

Typically, a NIC may track network statistics via counters that are implemented in dedicated on-die memory. Software executing in the computing device can query the NIC and, in response to the query, obtain counter values corresponding to the network statistics for a given network flow, such as a total number of packets sent/received, total number of bytes set/received, and the like. However, the number of counters to provision on-die is a known issue in technology in terms of scalability. For instance, certain environments, such as virtualization environments, may require a substantial amount of counters to monitor various network flows and thus require a relatively large die size, which can be impractical. In addition to scaling issues, the amount of counters required for a typical environment is generally difficult to predict during a product lifecycle, as requirements change from time to time. An actual amount provisioned on-die that deviates significantly from the actual amount required can result in inefficiency.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
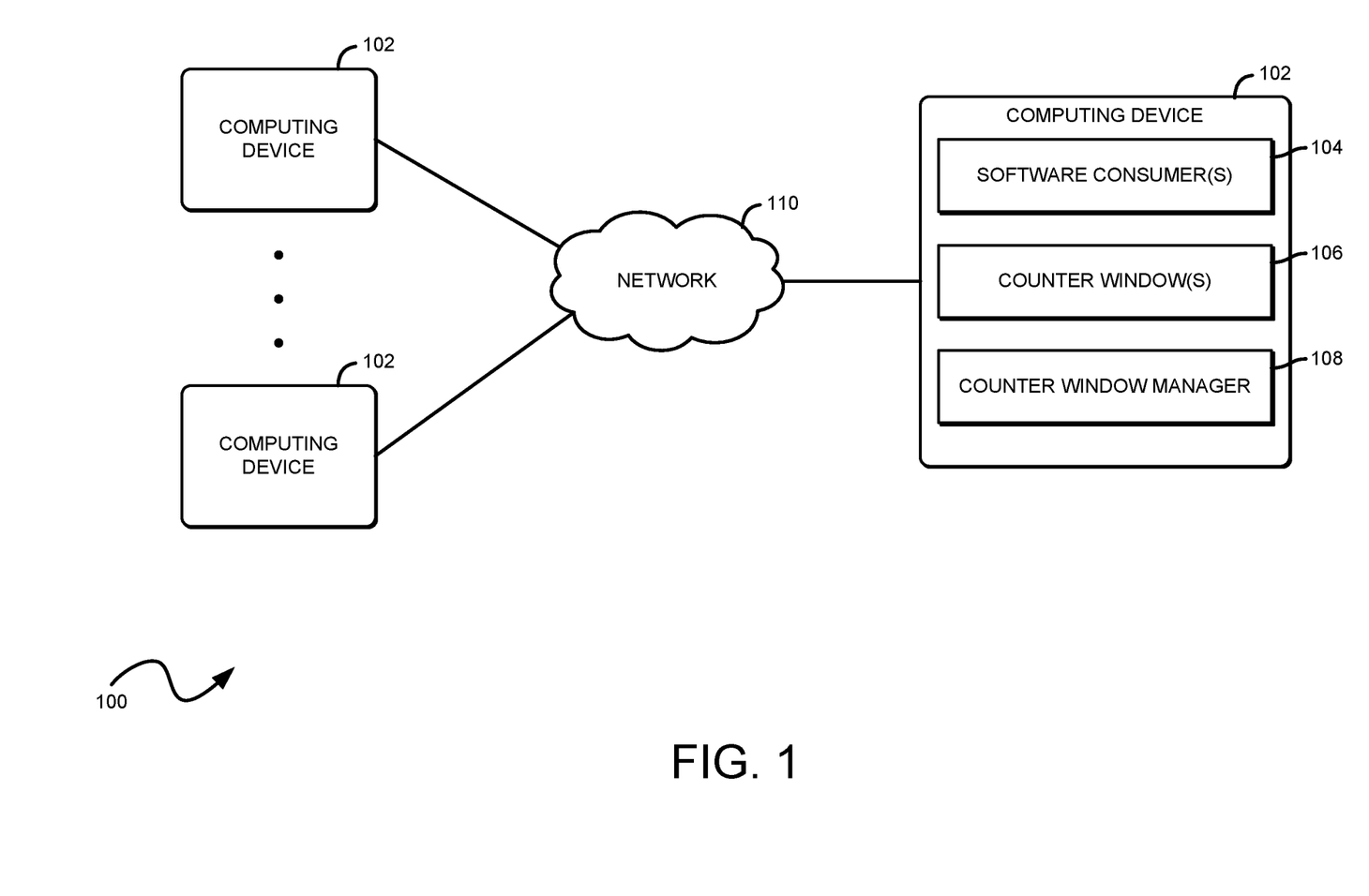
FIG. 1 is a simplified block diagram of at least one embodiment of a computing environment to dynamically track statistics using counter windows.

Referring now to FIG. 1, a computing environment 100 in which multiple computing devices 102 communicatively couple with one another over a network 110 is shown. In some embodiments, the computing environment 100 is representative of a data center of networked computing devices 102 that perform various functions. For example, each computing device 102 may execute one or more workloads (e.g., applications). During execution of a workload, a given computing device 102 may transmit data over the network 110 to another computing device 102. Further, a computing device 102 may track network statistics for a network flow via a network interface controller (NIC) configured thereon. The NIC may be configured with one or more counters, each storing a value that is indicative of a network statistic, such as a total amount of packets received, a total amount of packets sent, an amount of packets received over a given protocol, number of bytes sent and received, and the like.

Illustratively, a computing device 102 includes one or more software consumers 104, one or more counter windows 106, and a counter window manager 108. A software consumer 104 is representative of an entity executing in the computing device 102 that may request counter values associated with a network flow of a given workload. In some embodiments, a software consumer corresponds to a device driver provided by an operating system (OS) of the computing device 102, where the device driver provides an interface between the NIC and the OS. The software consumer 104 may report counter values to the OS, which in turn may perform some action in response to the reported values.

As further described herein, the counter window manager 108 provisions each software consumer 104 with one or more counter windows 106. In some embodiments, a counter window 106 may be implemented via on-die storage on the computing device 102. The NIC uses a counter window 106 to store one or more active statistic counters in the NIC associated with a software consumer 104. In particular, a counter window 106 may be associated with an identifier (e.g., a universally unique identifier (UUID)). The counter window manager 108 may assign a given counter window 106 to a software consumer 104 by the identifier. Further, as counters become active for a given network flow associated with the software consumer 104, the counter window manager 108 includes the corresponding counter to the associated counter window 106. Further still, the counter window manager 108 may flush a given window to host memory on the computing device 102 in response to certain flush criteria. Advantageously, doing so allows a counter window 106 to maintain the most recent counters for a given network flow and also allows counters on the NIC to more efficiently track network statistics for the computing device 102.

Figure 2:
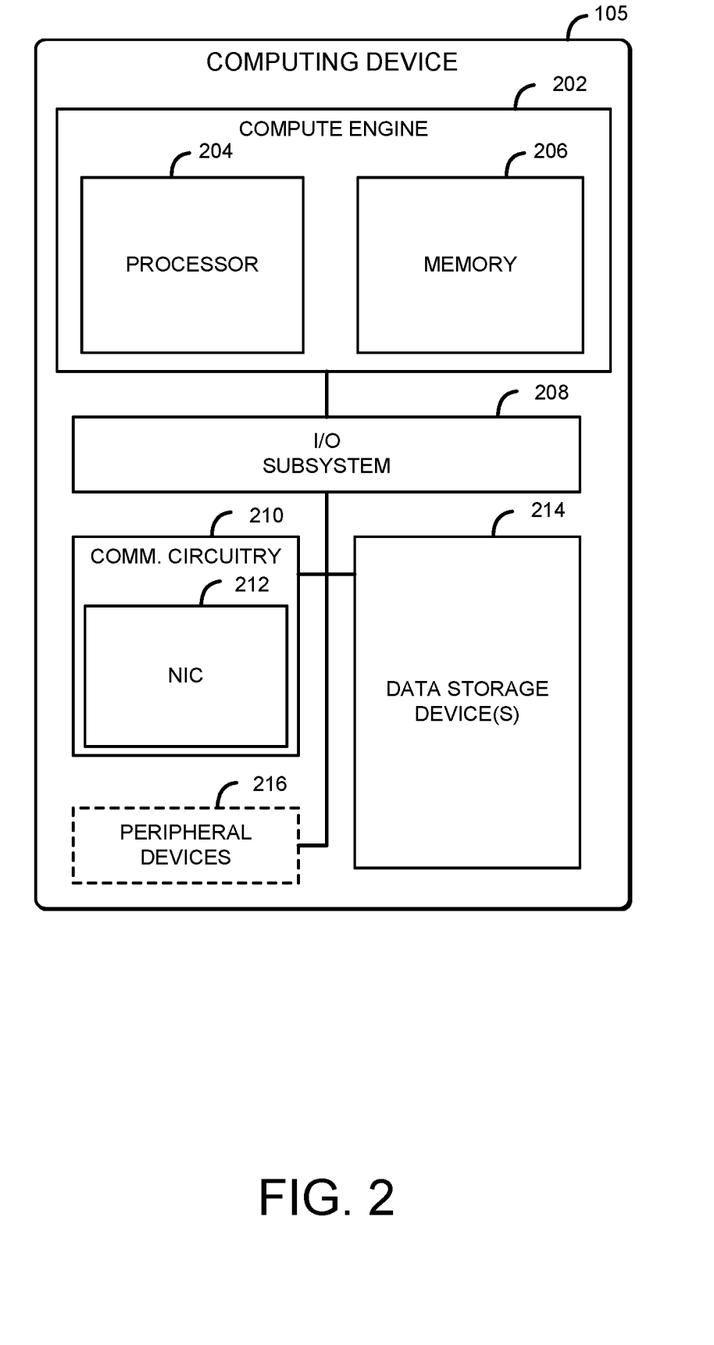
FIG. 2 is a simplified block diagram of at least one embodiment of the network computing device of the computing environment of FIG. 1.

Referring now to FIG. 2, the computing device 200 may be embodied as any type of device capable of performing the functions described herein, including provisioning a counter window to a software consumer executing thereon, determining whether one or more flush criteria for transferring counter values to host memory is triggered, and transferring the counter values to the host memory in response to such a determination. As shown, the illustrative computing device 102 includes a compute engine 202, an input/output (I/O) subsystem 208, communication circuitry 210, and one or more data storage devices 214. Of course, in other embodiments, the computing device 102 may include other or additional components, such as those commonly found in a computer (e.g., display, peripheral devices, etc.), such as peripheral devices 216. Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, a FPGA, a system-on-a-chip (SOC), or other integrated system or device. Additionally, in some embodiments, the compute engine 202 includes or is embodied as a processor 204 and a memory 204. The processor 204 may be embodied as one or more processors, each processor being a type capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an ASIC, reconfigurable hardware or hardware circuitry, or other specialized hardware to facilitate performance of the functions described herein.

The memory 206 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 206 may be integrated into the processor 204. In operation, the memory 206 may store various software and data used during operation such as global counter values corresponding to network statistics.

The compute engine 202 is communicatively coupled with other components of the computing environment 100 via the I/O subsystem 208, which may be embodied as circuitry and/or components to facilitate input/output operations with the compute engine 202 (e.g., with the processor 204 and/or the memory 206) and other components of the computing g device 102. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a system-on-a-chip (SoC) and be incorporated, along with one or more of the processor 204, the memory 206, and other components of the computing device 102, into the compute engine 202.

The communication circuitry 210 may be embodied as any communication circuit, device, or collection thereof, capable of enabling communications over a network between the computing device 102 and another computing device (e.g., a computing device 102 interconnected via the network 110, etc.). The communication circuitry 210 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 210 includes a network interface controller (NIC) 212, which may also be referred to as a host fabric interface (HFI). The NIC 212 may be embodied as one or more add-in-boards, daughter cards, network interface cards, controller chips, chipsets, or other devices that may be used by the computing device 102 to connect with another computing device 102. In some embodiments, the NIC 212 may be embodied as part of a system-on-a-chip (SoC) that includes one or more processors, or included on a multichip package that also contains one or more processors. In some embodiments, the NIC 212 may include a local processor (not shown) and/or a local memory (not shown) that are both local to the NIC 212. In such embodiments, the local processor of the NIC 212 may be capable of performing one or more of the functions of the compute engine 202 described herein. Additionally or alternatively, in such embodiments, the local memory of the NIC 212 may be integrated into one or more components of the computing device 102 at the board level, socket level, chip level, and/or other levels.

The one or more illustrative data storage devices 214 may be embodied as any type of devices configured for short-term or long-term storage of data such as, for example, memory devices and circuits, memory cards, hard disk drives (HDDs), solid-state drives (SSDs), or other data storage devices. Each data storage device 214 may include a system partition that stores data and firmware code for the data storage device 214. Each data storage device 214 may also include an operating system partition that stores data files and executables for an operating system.

Additionally or alternatively, the computing device 102 may include one or more peripheral devices 216. Such peripheral devices 216 may include any type of peripheral device commonly found in a compute device such as a display, speakers, a mouse, a keyboard, and/or other input/output devices, interface devices, and/or other peripheral devices.

As described above, the computing device 102 is illustratively in communication with other computing devices 102 via the network 110, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
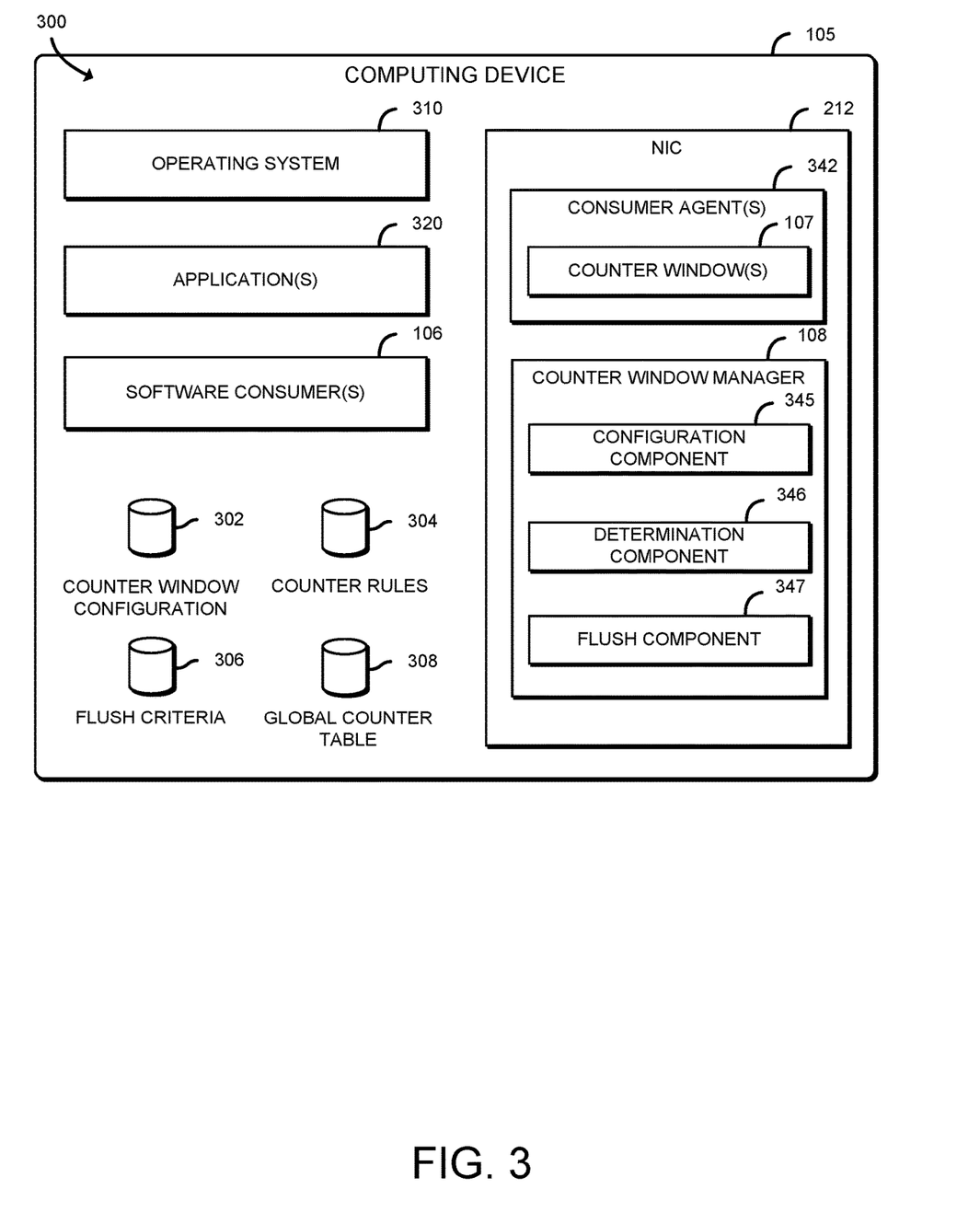
FIG. 3 is a simplified block diagram of at least one embodiment of an environment that may be established by the network computing device of FIG. 2.

Referring now to FIG. 3, the computing device 102 may establish an environment 300 during operation. The illustrative environment 300 includes an operating system (OS) 310, one or more applications 320, the one or more software consumers 104, and the NIC 212, which itself includes one or more consumer agents 342 and the counter window manager 108. Each of the components of the environment 300 may be embodied as hardware, firmware, software, or a combination thereof. As such, in some embodiments, one or more of the components of the environment 300 may be embodied as circuitry or a collection of electrical devices (e.g., consumer agent circuitry 342, counter window manager circuitry 108, etc.). It should be appreciated that, in such embodiments, one or more of the consumer agent circuitry 342 or the counter window manager circuitry 108 may form a portion of the NIC 212 (or other components of the computing device 102). In the illustrative embodiment, the environment 300 includes a counter window configuration 302, which may be embodied as any data indicative of configuration parameters for a given counter window 106. Configuration parameters may include counter window identifiers, associations of counter window identifiers to a consumer agent 342, flush target locations in the memory 206, flush timers, window sizes, maximum counter limit values, and the like. The environment 300 also includes counter rules 304, which may be embodied as any data indicative of rules and conditions for initializing a counter, incrementing the counter, and the like. The environment 300 also includes flush criteria 306, which may be embodied as any data indicative of rules and conditions for flushing a counter window, e.g., transferring the contents of a counter window 106 to the memory 206. The environment 300 also includes a global counter table 308, which may be embodied as any data indicative of a structure storing counter values associated with one or more network flows of the software consumers 104.

The OS 310 is configured to manage hardware and software resources in the computing device 102. In some embodiments, the OS 310 directs the software consumers 104 to monitor certain network statistics for a given flow. For example, the OS 310 may send a request to a software consumer 104 to monitor packets on a given flow originating from an application 320 associated with the software consumer 104. In turn, the software consumer 104, via an associated consumer agent 342 on the NIC 212, may program the NIC 212 to track the packets at the desired flow via one of the counters.

The applications 320 may be embodied as any type of software executing on the computing device 102 that communicates over the network 110, such as to perform a workload. The software consumers 104 may be embodied as any type of program executing on the computing device 102 that maintains a master copy of counter value data for one or more of the applications 320 via the global counter table 108. For example, the software consumer 104 may retrieve values flushed from a counter window 106 to the memory 206 (e.g., via a memory access operation) and update the global counter table 108, such as by adding the flushed counter value to a value of the corresponding counter on the global counter table 108. The software consumer 104 may identify (e.g., by performing a lookup operation) a corresponding counter via an identifier associated with the counter.

The consumer agent 342, which may be embodied as hardware, firmware, software, virtualized hardware, emulated architecture, and/or a combination thereof, is to track network statistics on the NIC 212 on behalf of an associated software consumer 104. In some embodiments, a consumer agent 342 is configured for a specific function, such as packet processing for a given protocol, network security, and the like.

The counter window manager 108, which may be embodied as hardware, firmware, software, virtualized hardware, emulated architecture, and/or a combination thereof, is to provision a counter window to a software consumer 104, determine whether one or more of the flush criteria 306 is triggered, and in response to such a determination, flush the counter window to the memory 206. To do so, the counter window manager 108 includes a configuration component 345, a determination component 346, and a flush component 347.

The configuration component 345 is configured to provision one or more counter windows 106 to a given consumer agent 342 associated with a software consumer 104. As stated, a counter window 106 is used to store one or more active network statistic counters associated with a software consumer 104. To do so, the configuration component 345 may evaluate the counter window configuration 302 and determine one or more parameters to apply to a counter window 106 to provision to a consumer agent 106. For example, the counter window configuration 302 may indicate, as parameters, a flush target location in the memory 206 associated with a software consumer 104 associated with the consumer agent 342, a window size, a flush timer, and the like. The configuration component 345 may set these parameters for the counter window 106 based on the configuration 302. Once provisioned, logic in the NIC 212 may increment counters for a given flow as the NIC 212 observes incoming and outgoing traffic and add an active counter to the provisioned counter window 106.

The determination component 346 is configured to evaluate a counter window 106 relative to the flush criteria 306. More particularly, the determination component 347 is to detect whether one or more of the flush criteria 306 is triggered. The flush criteria 306 specifies conditions in which the counter window manager 108 should transfer counter values currently stored by the counter window 106 to a flush target location in the memory 206. For example, the determination component 346 may monitor counter values and determine that a value for a given counter exceeds a specified maximum value for that particular counter in the configuration 302. The determination component 346 may also maintain timers that indicate when a given counter window 106 should be flushed (if configured to flush at a certain time interval). The determination component 346 may also receive explicit requests to flush a given counter window 106 (e.g., from a software consumer 104 or the OS 310).

The determination component 346, in response to a detection that a given counter window 106 should be flushed based on the flush criteria 306, may mark the counter window 106 for flushing. For example, to do so, the determination component 346 may set a flag indicative of whether the counter window 106 should be flushed. In addition, in some cases, the determination component 346 may add a counter window 106 to a queue of counter windows 106 marked for flushing. The queue may store pointers (e.g., via a counter window 106 identifier) to an associated counter window 106.

The flush component 347 is configured to transfer counter values maintained in the counter window 106 to a flush target location in the memory 206. In some embodiments, the flush component 348 may evaluate a queue to identify a counter window 106 that is marked to be flushed to the memory 206. Once identified, the flush component 348 may perform a direct memory access (DMA) operation to transmit the counter values to the memory 206. The flush component 348 may also remove the contents of the counter window 106 and indicate that the counter window 106 may be used by a consumer agent 342.

Logic in the memory 206 (or in the NIC 212) may access the flushed counter values at the flush target location and update the global counter table 308. Each flushed counter value may include an associated counter identifier. The logic may update the value in the global counter table 308 based on the associated counter identifier. For instance, the logic may add the counter value flushed from a given counter window 106 to the corresponding counter value in the counter table 308.

It should be appreciated that each of the configuration component 345, the determination component 346, and flush component 347 may be separately embodied as hardware, firmware, software, virtualized hardware, emulated architecture, and/or a combination thereof. For example, the configuration component 345 and flush component 347 may be embodied as hardware components, while the determination component 346 is embodied as virtualized hardware components or as some other combination of hardware, firmware, software, virtualized hardware, emulated architecture, and/or a combination thereof.

Figure 4:
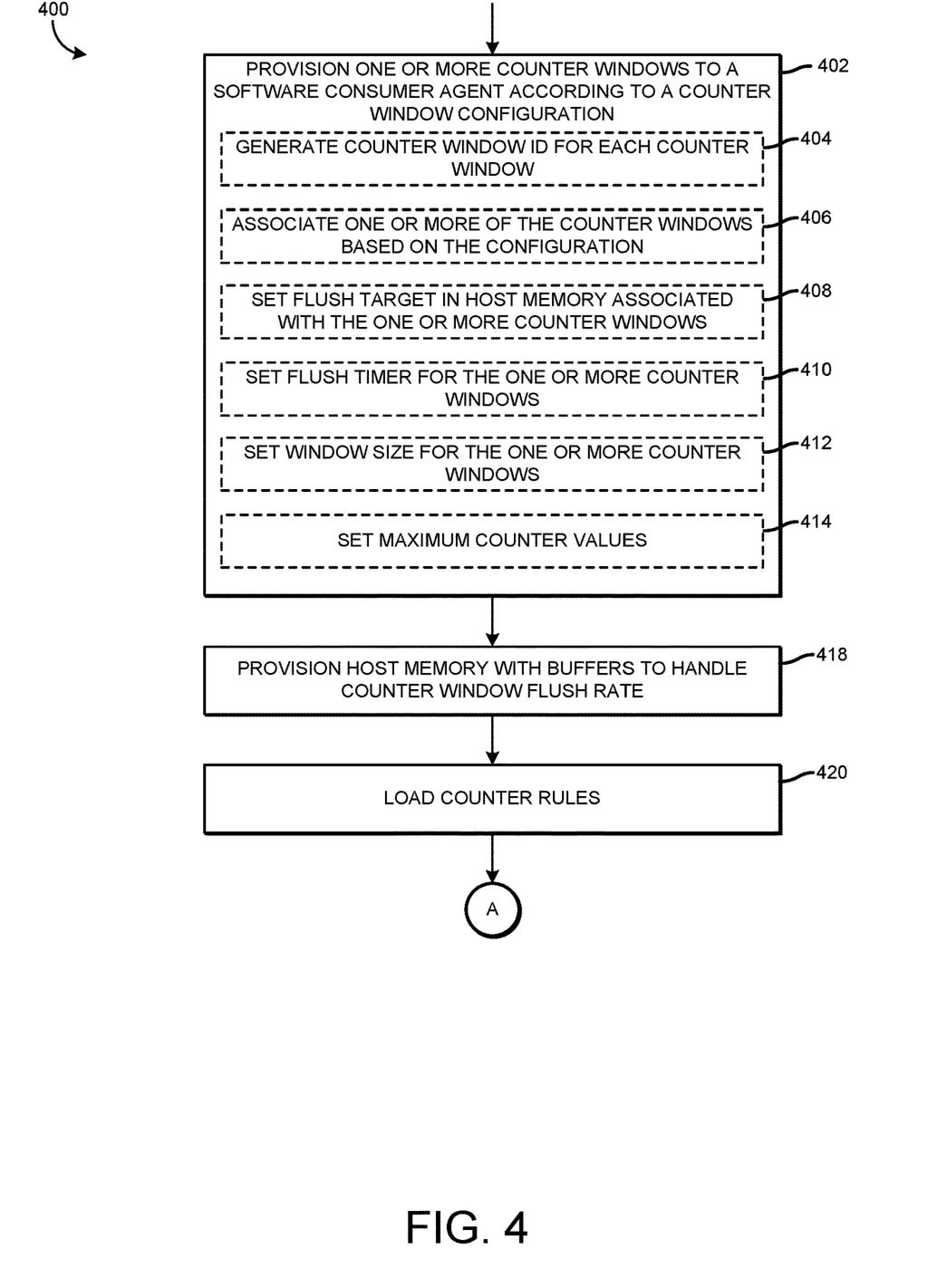
FIG. 4 is a simplified flow diagram of a method for initializing one or more counter windows to a software consumer agent.

Referring now to FIG. 4, the NIC 212, in operation, may perform a method 400 for initializing one or more counter windows 106 to a consumer agent 342. As shown, the method 400 begins in block 402, where the NIC 212 provisions one or more counter windows 106 to the consumer agent 342. In particular, in block 404, the NIC 212 generates a counter window identifier for each counter window 106. Further, in block 406, the NIC 212 associates one or more of the counter windows 106 based on the counter window configuration 302. To do so, the NIC 212 may program the consumer agent 342 with the generated identifier associated with the counter window 106. In block 408, the NIC 212 sets a target in the memory 206 indicative of a memory location for storing flushed counter values from the provisioned counter window(s) 106 according to the counter window configuration 302. Further, in block 410, the NIC 212 sets a flush timer for the counter window(s) 106 based on the configuration 302. The flush timer is indicative of a maximum amount of time for a counter window 106 to maintain active counter values before the NIC 212 flushes (or marks for flushing) the counter window 106. In block 412, the NIC 212 sets a window size for the counter window(s) 106. The window size is indicative of a maximum amount of active counter values that a counter window 106 may track at a given time. In block 414, the NIC 212 sets a maximum counter values. In particular, the NIC 212 may set a maximum value for each of the counters to be tracked for the associated consumer agent 342. A maximum counter value is indicative of a value for a given counter that, if exceeded, the NIC 212 then flushes (or marks for flushing) the counter window 106 to the memory 206.

In block 418, the NIC 212 provisions the memory 206 with buffers to temporarily store counter values that are flushed from a given counter window 106. In particular, the NIC 212 may configure the buffers with capacity to sufficiently hand a preconfigured flush rate. The NIC 212 (or logic in the memory 206) may transfer the data stored in the buffers to the flush target location in the memory 206.

In block 420, the NIC 212 loads the counter rules 304. Doing so allows the NIC 212, in operation, to determine whether to increment a counter in response to network activity (e.g., packets being sent from or received by the NIC 212). Doing so further allows the NIC 212 to add a counter (e.g., by counter identifier) to an associated counter window 106. For instance, referring now to FIG. 5, the NIC 212, in operation, may perform the following in response to determining that a packet sent from or received by the NIC 212 triggers a counter rule. In block 422, the NIC 212 determines whether a counter rule is triggered. For example, a packet may be sent over a given connection associated with a software consumer 104. Such an action may trigger a rule to increment a counter corresponding to total packets sent.

Figure 5:
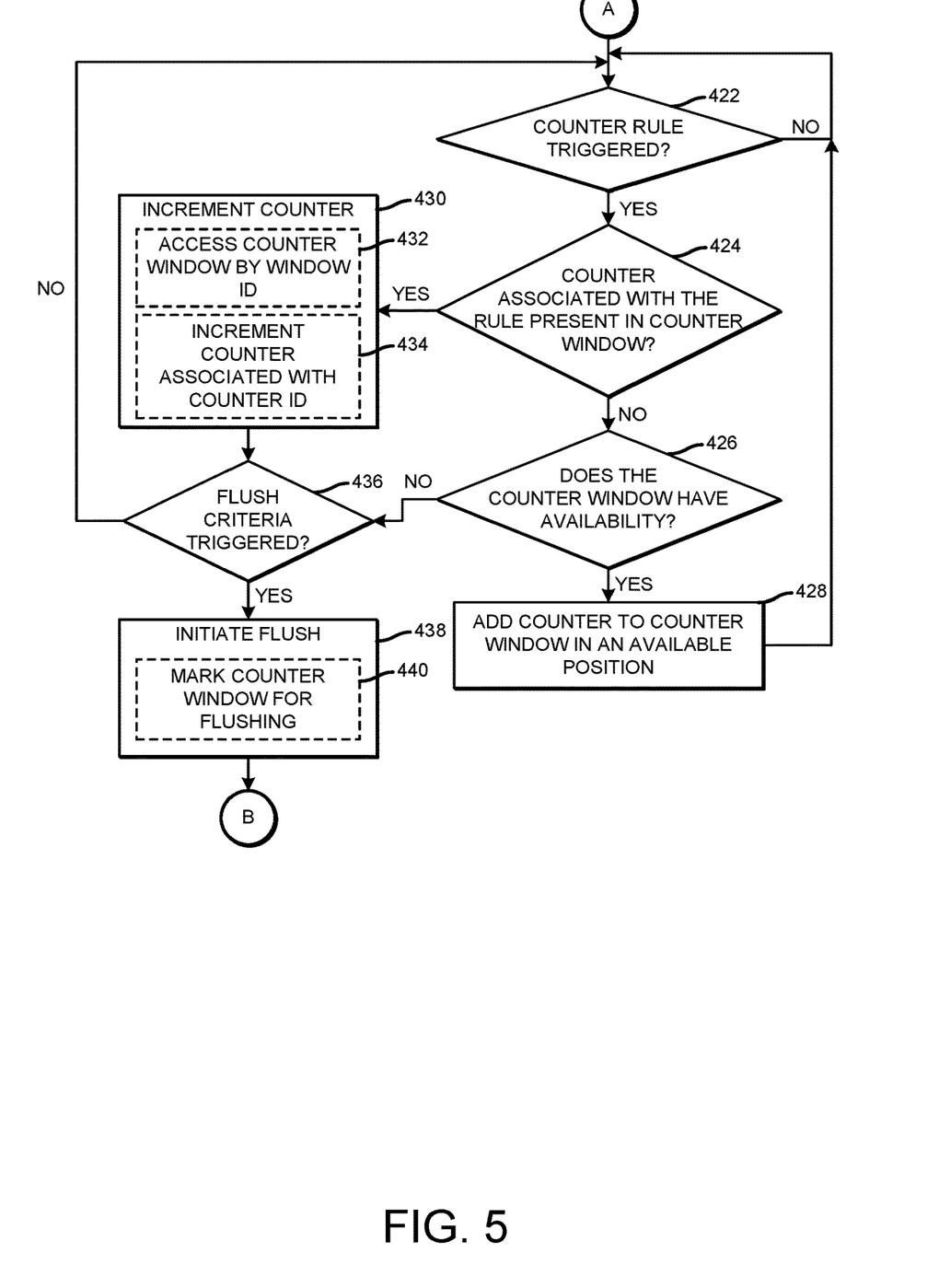
FIG. 5 is a simplified flow diagram of a method for managing active counters for a given software consumer.

In such a case, in block 424, the NIC 212 determines whether a counter that is associated with the counter rule is currently maintained in the counter window 106 of the corresponding consumer agent 342. If so, then in block 430, the NIC 212 increments to corresponding counter. For instance, to do so, in block 342, the NIC 212 accesses the counter window 106 by reference to the counter window identifier. In block 434, the NIC 212 increments the value of the counter maintained by the counter window 106. To do so, the NIC 212 may look up the counter in the counter window 106 by the identifier associated with the counter. In block 436, the NIC 212 determines whether one or more of the flush criteria 306 are triggered. Continuing the previous example, flush criteria 306 could be triggered if the total number of packets exceeds a maximum value for counter window storage (as configured). If triggered, then in block 438, the NIC 212 initiates flush proceedings. In block 440, the NIC 212 may mark the counter window 106 to be flushed and add the counter window 106 to a queue. The flush procedure is discussed further relative to FIG. 6.

If a counter rule is triggered in the NIC 212 and a counter is not currently present in the associated counter window 106, then the counter should be included with the counter window 106. In block 426, if a counter associated with the triggered counter rule is not present in the counter window 106, then the NIC 212 determines whether the counter window 106 has availability. More specifically, the NIC 212 determines whether the counter window 106 has an available location therein to maintain the active counter. If not, then the method proceeds to blocks 436 and 438, where flush criteria are triggered and a flush procedure is initiated, respectively. Further, the NIC 212 allocates a new counter window 106 and adds the counter (e.g., by counter identifier) to the newly-allocated counter window 106. Otherwise, in block 428, the NIC 212 adds the counter to the available counter window 106 in an available position of the counter window 106. For instance, the NIC 212 may add the counter identifier pointing to the corresponding value in the available position in the counter window 106. In addition, the NIC 212 increments the counter value based on the received packet.

Figure 6:
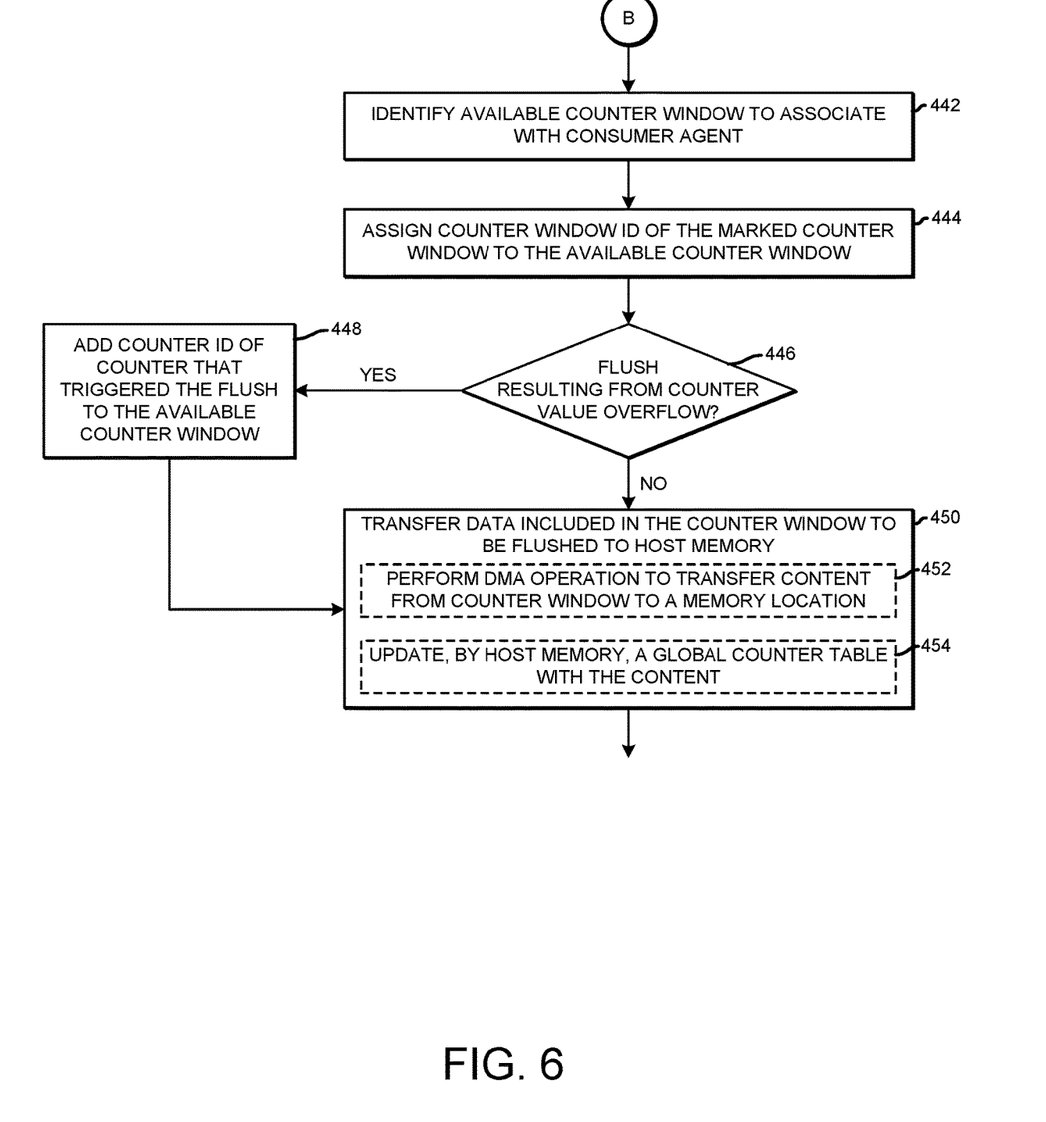
FIG. 6 is a simplified flow diagram of a method for transferring data from a counter window to host memory in response to one or more flush criteria being satisfied.

As stated, during operation, the computing device 102 may trigger certain flush criteria 306 for a network connection associated with a software consumer 104, which causes the NIC 212 to perform a flush procedure on the counter window 106 associated with an agent of the software consumer 104 (e.g., consumer agent 342). Referring now to FIG. 6, the NIC 212 may flush a counter window 106 to the memory 206 according to the depicted method flow. In some embodiments, the NIC 212 may flush a counter window 106 that is placed in a queue (e.g., by counter window identifier) of counter windows marked to be flushed. In some embodiments, the NIC 212 may automatically flush a counter window 106 following the triggering of flush criteria 306.

In block 442, the NIC 212 identifies a new counter window 106 to assign to the consumer agent 342. More particularly, the NIC 212 may identify a counter window 106 that is currently unused by any of the executing consumer agents 342. To do so, the NIC 212 evaluates counter windows 106 that are currently programmed to a consumer agent 342. In block 444, the NIC 212 assigns the counter window identifier of the counter window 106 to be flushed to the identified counter window 106. Doing so effectively provisions the new counter window 106 to the consumer agent 342.

Further, in block 446, the NIC 212 determines whether the flush criteria 306 triggered resulted from a value overflow for a given counter. If so, then the NIC 212 adds an identifier associated with that counter to the newly provisioned counter window 106. The NIC 212 may also increment the value of that counter. Following either block 446 (if the flush does not result from a counter value overflow) or block 448, in block 450, the NIC 212 transfers data included in the counter window to be flushed to the memory 206. For instance, to do so, in block 452, the NIC 212 performs a DMA operation to transfer content (e.g., counter identifiers and corresponding values) from the counter window 106 to the flush target location in the memory 206. Further still, in block 454, the NIC 212 (or logic in the memory 206) updates the global counter table 308 with the transferred content. For example, the NIC 212 may add values flushed from a given counter to the corresponding counter in the global counter table 308.

Examples

Illustrative examples of the technologies disclosed herein are provided below. An embodiment of the technologies may include any one or more, and any combination of, the examples described below.

Example 1 includes a computing device, comprising a compute engine having a memory; and a network interface controller (NIC) to provision a first counter window of a plurality of counter windows to a software consumer executed by the computing device, wherein the first counter window is used to track a plurality of active counters associated with one of a plurality of network flows; determine whether one or more criteria to flush the first counter window is triggered; and in response to a determination that the one or more criteria are triggered, transfer an incremental value for each active counter of the plurality of active counters to the memory.

Example 2 includes the subject matter of Example 1, and wherein the NIC is further to identify a second counter window of the plurality of counter windows, wherein the second counter window is available to the software consumer; and associate the second counter window with the software consumer.

Example 3 includes the subject matter of any of Examples 1 and 2, and wherein the first counter window is associated with an identifier, and wherein the NIC is further to associate the identifier with the second counter window.

Example 4 includes the subject matter of any of Examples 1-3, and wherein the one or more criteria includes at least one of an overflow of the first counter window, an overflow of one of the plurality of active counters included with the first counter window, an expiration of a timer associated with the first counter window, or a flush request from the software consumer.

Example 5 includes the subject matter of any of Examples 1-4, and wherein to provision the first counter window comprises to generate an identifier indicative of an association of the first counter window to the software consumer; and configure one or more parameters for the first counter window.

Example 6 includes the subject matter of any of Examples 1-5, and wherein the one or more parameters includes at least one of a flush target value, a flush timer value, a size of the first counter window, a flush rate, or a maximum counter limit value, and wherein to provision the first counter window further comprises to provision the memory with one or more buffers used to temporarily store the value for each active counter.

Example 7 includes the subject matter of any of Examples 1-6, and wherein the NIC is further to configure one or more rules for incrementing the plurality of active counters.

Example 8 includes the subject matter of any of Examples 1-7, and wherein the NIC is further to determine whether one of the one or more rules is triggered, in response to a determination that one of the one or more rules is triggered, add an active counter triggering the one of the one or more rules to the first counter window.

Example 9 includes the subject matter of any of Examples 1-8, and wherein to transfer the value for each active counter to the memory comprises to perform a direct memory access operation to transfer the value for each active counter from the first counter window to a specified location in the memory; and update, by the memory, a global table storing a value for a plurality of counters.

Example 10 includes the subject matter of any of Examples 1-9, and wherein, further in response to a determination that the one or more criteria is triggered, the NIC is to mark the first counter window to be flushed; and insert the first counter window into a flush queue that includes one or more of the plurality of counter windows.

Example 11 includes one or more machine-readable storage media comprising a plurality of instructions stored thereon that, in response to being executed, causes a computing device to provision a first counter window of a plurality of counter windows to a software consumer executed by the computing device, wherein the first counter window is used to track a plurality of active counters associated with one of a plurality of network flows; determine whether one or more criteria to flush the first counter window is triggered; and in response to a determination that the one or more criteria are triggered, transfer an incremental value for each active counter of the plurality of active counters to a memory in the computing device.

Example 12 includes the subject matter of Example 11, and wherein the plurality of instructions further causes the computing device to identify a second counter window of the plurality of counter windows, wherein the second counter window is available to the software consumer; and associate the second counter window with the software consumer.

Example 13 includes the subject matter of any of Examples 11 and 12, and wherein the first counter window is associated with an identifier, and wherein the plurality of instructions further causes the computing device to associate the identifier with the second counter window.

Example 14 includes the subject matter of any of Examples 11-13, and wherein the one or more criteria includes at least one of an overflow of the first counter window, an overflow of one of the plurality of active counters included with the first counter window, an expiration of a timer associated with the first counter window, or a flush request from the software consumer.

Example 15 includes the subject matter of any of Examples 11-14, and wherein to provision the first counter window comprises to generate an identifier indicative of an association of the first counter window to the software consumer; and configure one or more parameters for the first counter window.

Example 16 includes the subject matter of any of Examples 11-15, and wherein the one or more parameters includes at least one of a flush target value, a flush timer value, a size of the first counter window, a flush rate, or a maximum counter limit value, and wherein to provision the first counter window further comprises to provision the memory with one or more buffers used to temporarily store the value for each active counter.

Example 17 includes the subject matter of any of Examples 11-16, and wherein the plurality of instructions further causes the computing device to configure one or more rules for incrementing the plurality of active counters.

Example 18 includes the subject matter of any of Examples 11-17, and wherein the plurality of instructions further causes the computing device to determine whether one of the one or more rules is triggered, in response to a determination that one of the one or more rules is triggered, add an active counter triggering the one of the one or more rules to the first counter window.

Example 19 includes the subject matter of any of Examples 11-18, and wherein to transfer the value for each active counter to the memory comprises to perform a direct memory access operation to transfer the value for each active counter from the first counter window to a specified location in the memory; and update, by the memory, a global table storing a value for a plurality of counters.

Example 20 includes the subject matter of any of Examples 11-19, and wherein, further in response to a determination that the one or more criteria is triggered, the plurality of instructions further causes the computing device to mark the first counter window to be flushed; and insert the first counter window into a flush queue that includes one or more of the plurality of counter windows.

Example 21 includes a method comprising provisioning, by a computing device, a first counter window of a plurality of counter windows to a software consumer executed by the computing device, wherein the first counter window is used to track a plurality of active counters associated with one of a plurality of network flows; determining, by the computing device, whether one or more criteria to flush the first counter window is triggered; and in response to a determination that the one or more criteria are triggered, transferring, by the computing device, an incremental value for each active counter of the plurality of active counters to a memory in the computing device.

Example 22 includes the subject matter of Example 21, and further including identifying, by the computing device, a second counter window of the plurality of counter windows, wherein the second counter window is available to the software consumer; and associating, by the computing device, the second counter window with the software consumer.

Example 23 includes the subject matter of any of Examples 21 and 22, and wherein transferring the value for each active counter to the memory comprises performing, by the computing device, a direct memory access operation to transfer the value for each active counter from the first counter window to a specified location in the memory.

Example 24 includes a computing device comprising a memory; means for provisioning a first counter window of a plurality of counter windows to a software consumer executed by the computing device, wherein the first counter window is used to track a plurality of active counters associated with one of a plurality of network flows; means for determining whether one or more criteria to flush the first counter window is triggered; and circuitry for, in response to a determination that the one or more criteria are triggered, transferring an incremental value for each active counter of the plurality of active counters to a memory in the computing device.

Example 25 includes the subject matter of Example 24, and further including means for identifying a second counter window of the plurality of counter windows, wherein the second counter window is available to the software consumer; and means for associating the second counter window with the software consumer.

The invention claimed is:

1. A network interface controller (NIC) to:
provision a first counter window of a plurality of counter windows to a software consumer executed by a computing device, wherein the first counter window is used to track a plurality of active counters associated with one of a plurality of network flows;
determine whether one or more criteria to flush the first counter window is triggered; and
in response to a determination that the one or more criteria are triggered, transfer an incremental value for each active counter of the plurality of active counters to a memory.

2. The NIC of claim 1, wherein the NIC is further to:
identify a second counter window of the plurality of counter windows, wherein the second counter window is available to the software consumer; and
associate the second counter window with the software consumer.

3. The NIC of claim 2, wherein the first counter window is associated with an identifier, and wherein the NIC is further to:
associate the identifier with the second counter window.

4. The NIC of claim 1, wherein the one or more criteria includes at least one of an overflow of the first counter window, an overflow of one of the plurality of active counters included with the first counter window, an expiration of a timer associated with the first counter window, or a flush request from the software consumer.

5. The NIC of claim 1, wherein to provision the first counter window comprises to:
generate an identifier indicative of an association of the first counter window to the software consumer; and
configure one or more parameters for the first counter window.

6. The NIC of claim 5, wherein the one or more parameters includes at least one of a flush target value, a flush timer value, a size of the first counter window, a flush rate, or a maximum counter limit value, and wherein to provision the first counter window further comprises to provision the memory with one or more buffers used to temporarily store the value for each active counter.

7. The NIC of claim 1, wherein the NIC is further to configure one or more rules for incrementing the plurality of active counters.

8. The NIC of claim 7, wherein the NIC is further to:
determine whether one of the one or more rules is triggered,
in response to a determination that one of the one or more rules is triggered, add an active counter triggering the one of the one or more rules to the first counter window.

9. The NIC of claim 1, wherein to transfer the value for each active counter to the memory comprises to:
perform a direct memory access operation to transfer the value for each active counter from the first counter window to a specified location in the memory; and
update, by the memory, a global table storing a value for a plurality of counters.

10. The NIC of claim 1, wherein, further in response to a determination that the one or more criteria is triggered, the NIC is to:
mark the first counter window to be flushed; and
insert the first counter window into a flush queue that includes one or more of the plurality of counter windows.

11. One or more non-transitory machine-readable storage media comprising a plurality of instructions stored thereon that, in response to being executed, causes a computing device to:
provision a first counter window of a plurality of counter windows to a software consumer executed by the computing device, wherein the first counter window is used to track a plurality of active counters associated with one of a plurality of network flows;
determine whether one or more criteria to flush the first counter window is triggered; and
in response to a determination that the one or more criteria are triggered, transfer an incremental value for each active counter of the plurality of active counters to a memory in the computing device.

12. The one or more non-transitory machine-readable storage media of claim 11, wherein the plurality of instructions further causes the computing device to:
identify a second counter window of the plurality of counter windows, wherein the second counter window is available to the software consumer; and
associate the second counter window with the software consumer.

13. The one or more non-transitory machine-readable storage media of claim 12, wherein the first counter window is associated with an identifier, and wherein the plurality of instructions further causes the computing device to:
associate the identifier with the second counter window.

14. The one or more non-transitory machine-readable storage media of claim 11, wherein the one or more criteria includes at least one of an overflow of the first counter window, an overflow of one of the plurality of active counters included with the first counter window, an expiration of a timer associated with the first counter window, or a flush request from the software consumer.

15. The one or more non-transitory machine-readable storage media of claim 11, wherein to provision the first counter window comprises to:
generate an identifier indicative of an association of the first counter window to the software consumer; and
configure one or more parameters for the first counter window.

16. The one or more non-transitory machine-readable storage media of claim 15, wherein the one or more parameters includes at least one of a flush target value, a flush timer value, a size of the first counter window, a flush rate, or a maximum counter limit value, and wherein to provision the first counter window further comprises to provision the memory with one or more buffers used to temporarily store the value for each active counter.

17. The one or more non-transitory machine-readable storage media of claim 11, wherein the plurality of instructions further causes the computing device to configure one or more rules for incrementing the plurality of active counters.

18. The one or more non-transitory machine-readable storage media of claim 17, wherein the plurality of instructions further causes the computing device to:
determine whether one of the one or more rules is triggered,
in response to a determination that one of the one or more rules is triggered, add an active counter triggering the one of the one or more rules to the first counter window.

19. The one or more non-transitory machine-readable storage media of claim 11, wherein to transfer the value for each active counter to the memory comprises to:
perform a direct memory access operation to transfer the value for each active counter from the first counter window to a specified location in the memory; and
update, by the memory, a global table storing a value for a plurality of counters.

20. The one or more non-transitory machine-readable storage media of claim 11, wherein, further in response to a determination that the one or more criteria is triggered, the plurality of instructions further causes the computing device to:
mark the first counter window to be flushed; and
insert the first counter window into a flush queue that includes one or more of the plurality of counter windows.

21. A method comprising:
provisioning, by a computing device, a first counter window of a plurality of counter windows to a software consumer executed by the computing device, wherein the first counter window is used to track a plurality of active counters associated with one of a plurality of network flows;
determining, by the computing device, whether one or more criteria to flush the first counter window is triggered; and
in response to a determination that the one or more criteria are triggered, transferring, by the computing device, an incremental value for each active counter of the plurality of active counters to a memory in the computing device.

22. The method of claim 21, further comprising:
identifying, by the computing device, a second counter window of the plurality of counter windows, wherein the second counter window is available to the software consumer; and
associating, by the computing device, the second counter window with the software consumer.

23. The method of claim 21, wherein transferring the value for each active counter to the memory comprises performing, by the computing device, a direct memory access operation to transfer the value for each active counter from the first counter window to a specified location in the memory.

24. A computing device comprising:
a memory;
means for provisioning a first counter window of a plurality of counter windows to a software consumer executed by the computing device, wherein the first counter window is used to track a plurality of active counters associated with one of a plurality of network flows;
means for determining whether one or more criteria to flush the first counter window is triggered; and
circuitry for, in response to a determination that the one or more criteria are triggered, transferring an incremental value for each active counter of the plurality of active counters to a memory in the computing device.

25. The computing device of claim 24, further comprising:
means for identifying a second counter window of the plurality of counter windows, wherein the second counter window is available to the software consumer; and
means for associating the second counter window with the software consumer.

* * * * *